United States Patent

Tachikawa

Patent Number: 5,260,809
Date of Patent: Nov. 9, 1993

[54] SHADING-COMPENSATION METHOD AND DEVICE IN IMAGE PROCESSING

[75] Inventor: Kyouji Tachikawa, Yamanashi, Japan

[73] Assignee: Nippon Seimitsu Kogyo Kabushiki Kaisha, Kofu, Japan

[21] Appl. No.: 647,208

[22] Filed: Jan. 28, 1991

Related U.S. Application Data

[63] Continuation of Ser. No. 329,568, Mar. 28, 1989, abandoned.

[30] Foreign Application Priority Data

Aug. 31, 1988 [JP] Japan ................. 63-217099

[51] Int. Cl.⁵ .............................................. H04N 1/40
[52] U.S. Cl. ................................... 358/461; 358/463
[58] Field of Search ............... 358/446, 447, 448, 455, 358/461, 462, 463

[56] References Cited

U.S. PATENT DOCUMENTS 4,806,780 2/1989 Yamamoto et al. ................. 358/461
4,807,045 2/1989 Shimano .............................. 358/461

FOREIGN PATENT DOCUMENTS 0254235 1/1988 European Pat. Off.
0101180 5/1987 Japan.

Primary Examiner—Edward L. Coles, Sr.
Assistant Examiner—Jerome Grant, II
Attorney, Agent, or Firm—Oblon, Spivak, McClelland, Maier & Neustadt

[57] ABSTRACT

In an image processing system in which shading-compensation for eliminating shading-distortion contained inevitably in image light directed to an image sensor via optical systems is carried out, at least two latch unit for temporarily storing comparative values obtained by scanning white and black image planes are disposed between memory means for the comparative values and a processing unit for compensating image signals obtained as a result of optically scanning a given objective image. Since the comparative value of the pixel subsequent to a pixel in process is rendered on standby in one of the latch units in preparation for the image processing for the subsequent pixel, the processing time can be remarkably increased consequently to speed up the image processing.

4 Claims, 5 Drawing Sheets

SHADING-COMPENSATION METHOD AND DEVICE IN IMAGE PROCESSING

This application is a continuation of application Ser. No. 07/329,568, filed on Mar. 28, 1989, now abandoned.

BACKGROUND OF THE INVENTION

1. Field of the Invention

This invention relates to a shading-compensation method and device for effectively eliminating shading-distortion resulting from nonlinear characteristics of optical systems and image pickup elements in image processing devices of various types, and more particularly to a shading-compensation method and device capable of carrying out image reading operations at high speed by efficiently reading out comparative values for shading-compensation which are beforehand stored in memory means.

2. Description of the Prior Art

In performing image processing with image scanners, facsimiles, copying machines or the like or effecting pattern recognition, an objective image given to be read is generally subjected to continuous scanning by one sub-scanning lines by use of a line sensor such as a CCD image sensor. For illuminating a reading portion of the objective image in order to read optically image information with the line sensor, a light source such as a fluorescent lamp and light-emitting diode array is generally used together with an optical system including lenses. However, every lens as used in such an optical system inevitably gives rise to shading-distortion because the intensity of the light which is reflected on the objective image given to be read and passes through the lens is decreased toward the peripheral portion of the lens. In order for eliminating the shading-distortion, there has been conventionally used a shading compensating plate which has light-transmission factor gradually increasing from the center toward the peripheral portion thereof, as proposed in Japanese Patent Publication Gazelle SHO 53(1978)-14329 and Japanese Utility Model Public Disclosures SHO 56(1981)-93061(A) and SHO 56(1981)-137563(A).

Also as disclosed in Japanese Patent Public Disclosure SHO 61(1986)-48982, the intensity of light emitted from a light source array might be made uniform by arraying light-emitting diodes in a line so as to increase the distance between the adjacent diodes going from the center portion toward the end portions of the diode array.

Although, in any of the prior art as mentioned above, the shading-compensation characteristic is invariable, the nonlinearity in light distribution of the light source is not always maintained constant. For instance, the distribution and intensity of the light emitted from the light source is subjected to a secular change. The change of intensity is apt to occur particularly in a rod-shaped illuminating means such as a fluorescent lamp. To be more exact, reflectance of a picture element at a specific column in each sub-scanning line on an undefiled surface given as a standard image is subtly different from those at the same column in the other lines.

Furthermore, the intensity of light reflected on the same pixel in the same sub-scanning line subtly varies because of indefinite optical factors such as irregularity of the optical system each time the same standard image surface is optically scanned. This is why the aforesaid shading-distortion is brought about. Although such shading-distortion must be eliminated to perform image processing with good reproductivity of image, however, the conventional shading-compensation methods as noted above could not effect the thorough shading-compensation, thereby to incur deterioration of the quality of a resultantly reproduced image obtained finally.

One example of the conventional methods for effecting compensation of the aforementioned shading-distortion will be described with reference to a block circuit diagram shown in FIG. 1. First, an objective image 1 given to be read is optically scanned with scanning means 2 to produce an image light b reflected on the objective image 1. The image light b is converted to an electric signal by a line sensor 3 such as a CCD image sensor and quantized by an analog-to-digital converter (A/D) 4, consequently to obtain an image data signal Si. In a processing unit 5, the image data signal Si thus obtained is compared with values VW, VB of reference data for white and black picture elements, which values are beforehand stored in memory 6, so that the image data signal Si is processed to be subjected to the shading-compensation. As a result, a compensated signal So is obtained and outputted to an external image processing device 9 via a buffer 7 and an interface circuit (I/F) 8.

In the aforementioned prior art method for effecting the shading-compensation, after transferring to the processing unit the image data signal Si which is produced as a result of optically reading the n'th picture element in a specific sub-scanning line virtually defined on the objective image, the reference values VWn, VBn for the n'th picture element are respectively read out from white-reference memory 6w and black-reference memory 6b and sent to the processing unit 5. Thereupon, the shading-compensation processing is effected. That is to say, as shown in the timing chart of FIG. 2, the image scanning for the n'th picture element and the data reading-out of the reference values of two sorts from the memory 5 are simultaneously carried out in the period t1-t2 and the arithmetic processing for comparing the read-out data signal with the respective reference values is carried out for the shading-compensation in the period t2-t3. Upon completion of the shading-compensation processing for n'th picture element, the n+1'th picture element is consecutively subjected to shading-compensation processing.

Thus, the conventional method has entailed a disadvantage in that the time lag of t1-t2 (transition time) occurs between the reading processes for the n'th and the n+1'th picture elements. Because the time lag required for the transition of the reading processes to the subsequent picture element occurs repeatedly every picture element until finishing the scanning of the whole image surface, the image reading processes consumes much time and remarkably reduces the processing rate.

SUMMARY OF THE INVENTION

In view of the aforesaid drawbacks of conventional shading-compensation method, it is an object of the present invention to provide a method and device capable of reliably compensating shading-distortion brought about in optically scanning a given objective image in image processing such as image-reading and pattern-recognition, and effecting the shading-compensation at high speed without giving rise to a time lag in the transition of the reading process to the subsequent picture element.

To attain the object described above according to this invention, there is provided a method for compensating shading-distortion which comprises producing comparative values from black and white reference data signals obtained as a result of preliminarily scanning black and white standard images, comparing an actual image value obtained by optically scanning an n'th pixel on a given objective image with the comparative value of the corresponding pixel to produce a compensating value from the ratio of the actual image value to the comparative value, compensating the actual image value with the compensating value, rendering the comparative value of an n+1'th pixel on standby in the course of compensating the n'th pixel, and reading out the comparative value of the n+1'th pixel for comparing the image signal of the subsequent pixel therewith at the time that the shading-compensation of the n'th pixel is completed.

The shading-compensation device of the present invention for practicing the method described above comprises memory means for storing either black or white reference signals obtained by preliminarily scanning black and white standard images and comparative values obtained from ones of the black and white reference signals as a result of preliminary scanning of the standard images, a processing unit for comparing an actual image value obtained by optically reading a given objective image with the corresponding comparative value to produce a compensating value from the ratio of the actual image value to the comparative value, at least one set of first and second latching circuits for temporarily latching the comparative values one after another so as to store the comparative value of the n+1'th pixel in the first latching circuit in the state that the comparative value of an n'th pixel is stored in the second latching circuit.

When the n'th pixel is processed by being compared with the comparative value predetermined for the n'th pixel which is read out from the second latching circuit, the comparative value of the n+1'th pixel is read out from the memory means and temporarily stored in the first latching circuit to be rendered on standby in preparation for providing the shading-compensation processing of the subsequent n+1'th picture element. Thus, the transferring of the comparative value of the n+1'th pixel to the first latching circuit and the shading-compensation processing of the subsequent n'th pixel are simultaneously carried out. Therefore, the time required for reading out the comparative value necessary for the shading-compensation from the memory means can be appreciably reduced to attain high-speed image processing.

The features of the present invention which are believed to be novel are set forth with particularity in the appended claims. The present invention, both as to its organization and manner or operation, together with further objects and advantages thereof, may best be understood by reference to the following description, taken in conjunction with the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
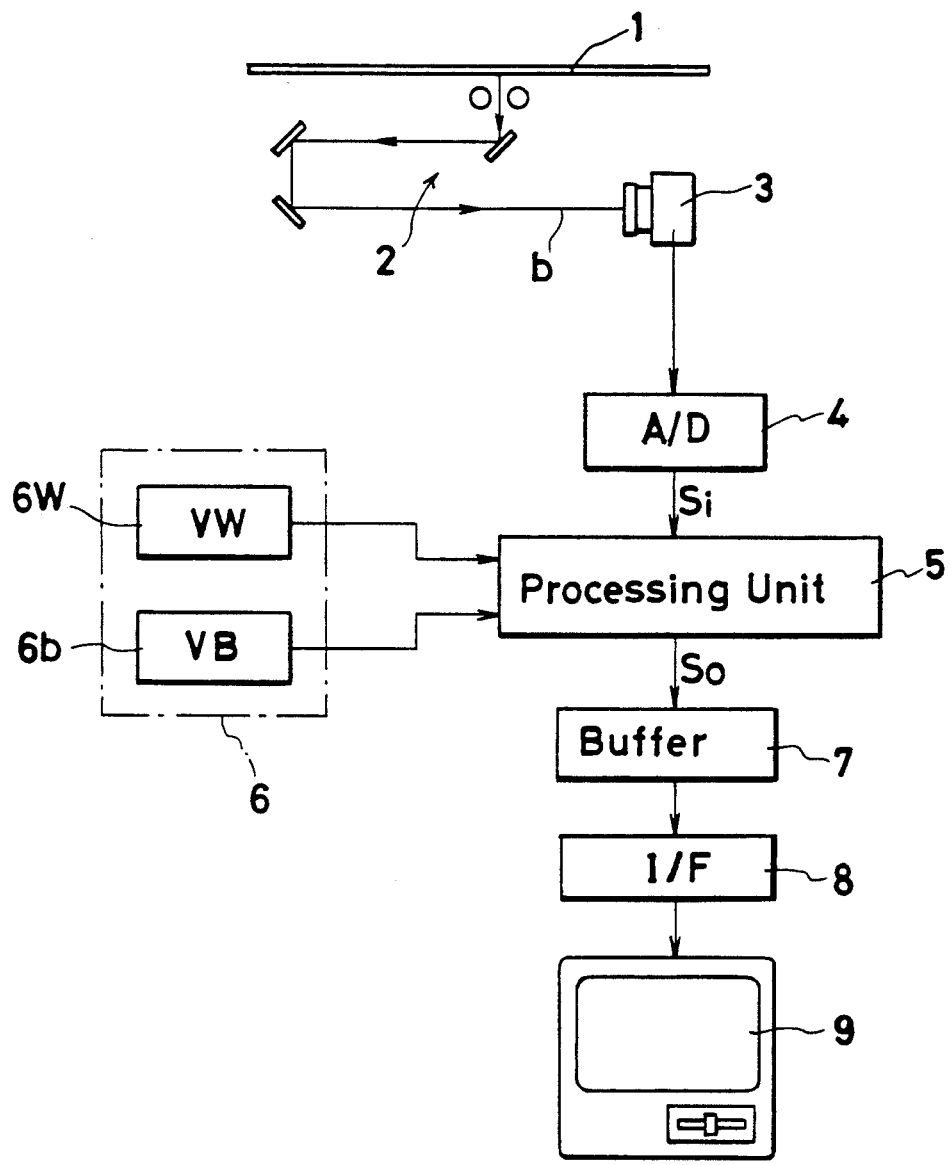
FIG. 1 is a block diagram of a conventional shading-compensation circuit.
Figure 2:
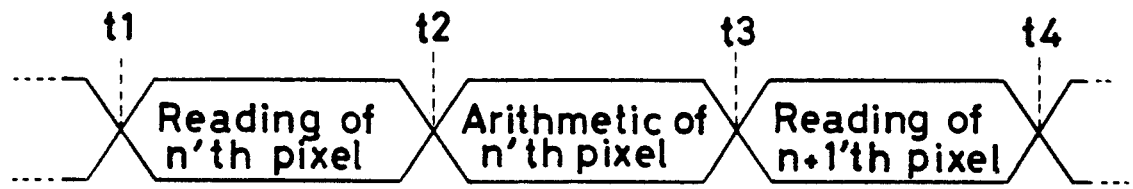
FIG. 2 is a timing chart showing the procedure of processing of the circuit of FIG. 1.
Figure 3:
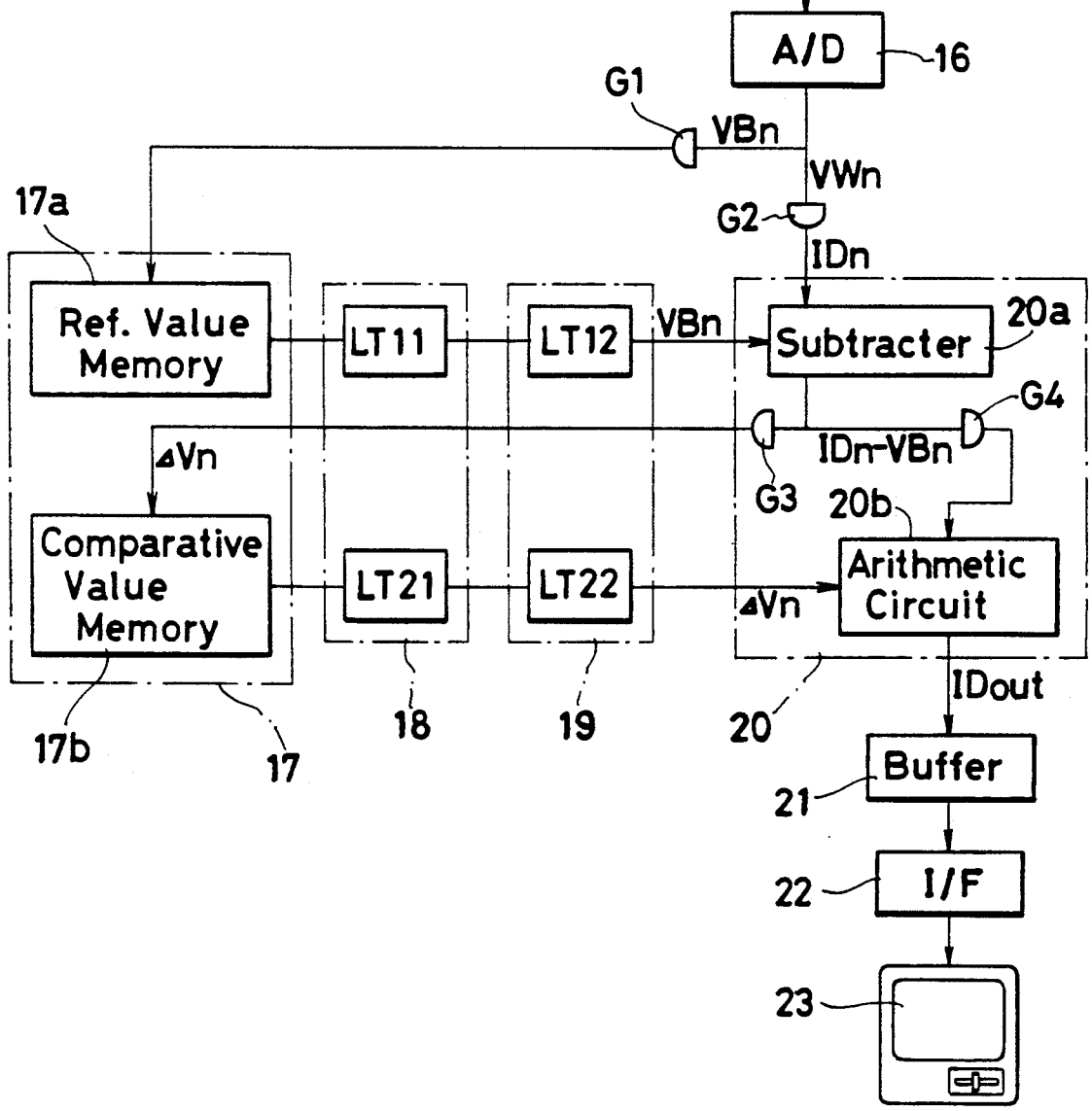
FIG. 3 is a schematic block diagram of an image processing system to which the shading-compensation method according to this invention is applied as one example.

One preferred embodiment of the shading compensation method according to this invention will be described hereinafter with reference to the block diagram shown in FIG. 3, illustrating schematically the device for practicing the method of this invention.

Figure 4:
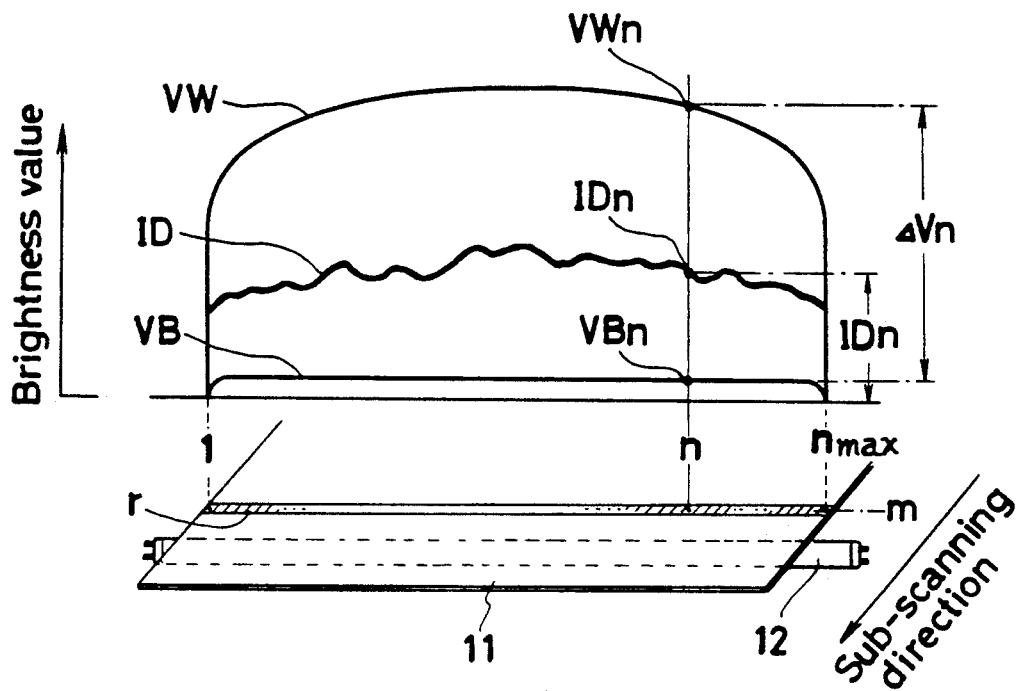
FIG. 4 is a graph showing shading-distortion characteristics in an image scanning system.

In FIG. 3 is schematically shown an image scanner 10 used as one example in the shading-compensation device of this invention. In the image scanner 10, a given objective image plane 11 is optically read by being illuminated with a linear beam of light which is emitted from a light source 12 and moves relative to the image plane 11 in the sub-scanning direction indicated by an arrow in FIG. 3. Reflected light b from a long and narrow part r thus illuminated on the objective image plane 11 is introduced to an image receiving surface of a line sensor 15 such as a CCD image sensor in image pickup means 14 through optical system 13 including reflectors, so that given image informations at every picture element on the image plane 11 are electrically converted to a series of image signals In. Assume that the illuminated part r corresponds to the m'th row of the sub-scanning lines into which the given image plane 11 is virtually divided. The n'th picture element in the m'th sub-scanning line is observed here for simplicity's sake as illustrated in FIGS. 3 and 4.

Prior to the image-scanning process for reading the given objective image, black and white standard planes are preliminarily scanned for determining the fundamental shading-distortion characteristics of the light source 12, the optical system 13 and the line sensor 15. That is, the preliminary scanning is carried out in such a manner that the intensities of light reflected on the n'th picture element in the m'th sub-scanning line of the respective black and white standard planes are detected by the line sensor 15 to obtain black and white reference values $VB_n$, $VW_n$ at the picture element under observation and the values $VB_n$, $VW_n$ thus obtained are compared with each other to find a comparative value equivalent to the difference $\Delta V_n$ ($=VW_n - VB_n$).

To be more specific, the image signal In obtained by preliminarily scanning throughout the black standard plane with the line sensor 15 is quantized by an analog-to-digital converter (A/D) 16 to produce the black reference value $VB_n$ at the n'th pixel. The black reference value $VB_n$ thus obtained is fed to reference value memory 17a in memory means 17 such as RAM through a gate G1. In fact, the black reference values for the picture elements (generally 1750 pixels, for example) of one sub-scanning line are stored in the memory 17a. The black reference value VBn in this case is equivalent to dark electric potential of at an n'th sensor element of the line sensor 15. In the second place, the white standard plane is scanned in the same manner as above to obtain an image signal. Namely, the white reference value VWn at the n'th pixel which is obtained by quantizing the image signal from the image sensor 15 with the A/D converter 16 is fed to a subtracter 20a in a processing unit 20 through a gate G2.

Figure 5:
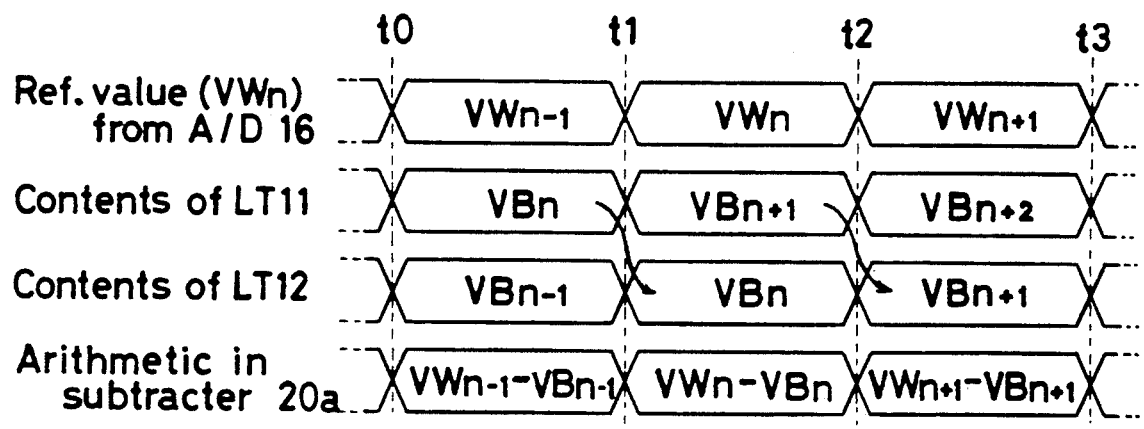
FIG. 5 is a timing chart showing the procedure of obtaining reference values in the shading-compensation method according to this invention.

At the same time that the preliminary scanning for the white standard plane is carried out to obtain the white reference value VWn, the black reference value VBn stored in advance in the reference value memory 17a is read out and sent to the subtracter 20a, consequently to find the difference (comparative value) ΔVn between the values VBn and VWn at the n'th pixel. In order to reduce the processing time required for effecting the preliminary scanning process as noted above, when the preceding n−1'th pixel is scanned in the period t0-t1, the black reference 5 value VBn of the n'th pixel is read out from the reference value memory 17a to a first latching circuit LT11 in a latch unit 18 so as to be on standby in preparation for the subsequent scanning process for the next n+1'th pixel in the latching circuit LT11 as shown in FIG. 5. When the scanning process of the n−1'th pixel is changed to that of the n'th pixel at the time t1, the black reference value VBn temporarily stored in the first latching circuit LT11 is transferred to a second latching circuit LT12 in a second latch unit 19. Then, at the same time that the white reference value VWn of the n'th picture element is sent from the A/D converter 16 to the subtracter 20a, the black reference value VBn of the n'th pixel is read out from the second latching circuit LT12 and transferred to the subtracter 20a so that the difference (comparative value) ΔVn between the values VWn and VBn is obtained. The comparative value ΔVn of the n'th pixel thus obtained is sent via a gate G3 and stored in comparative value memory 17b in the memory 17.

As shown in FIG. 5, when arithmetic operations for the comparative value ΔVn of the n'th pixel is executed in the subtracter 20a in the period t1-t2, a subsequent black reference value VBn+1 of an n+1'th pixel is read out from the memory 17a to be on standby in the first latching circuit LT11. After the time t2, the foregoing procedures are repeated while incrementing the address in the memory. The comparative values thus obtained for all the pixel in each sub-scanning line are temporarily stored in the comparative value memory 17b.

Figure 6:
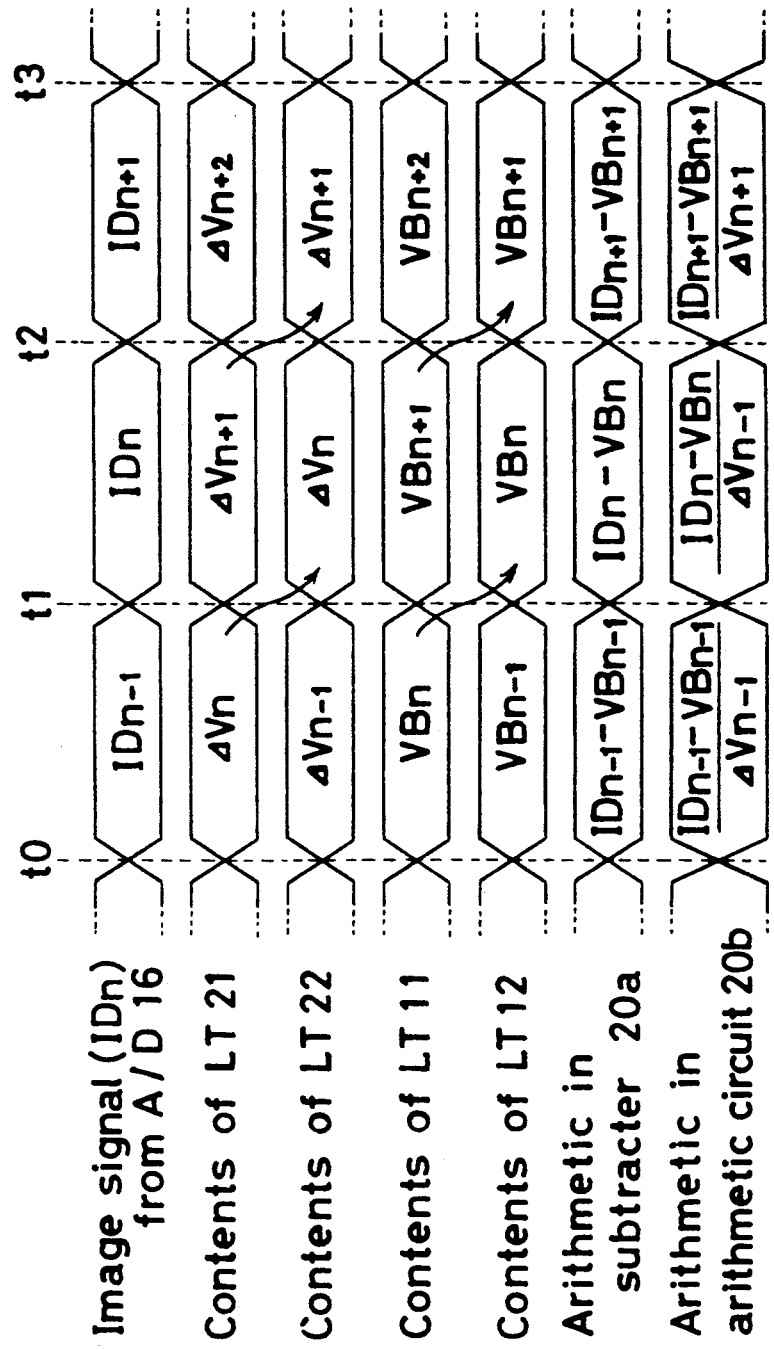
FIG. 6 is a timing chart showing the procedure of effecting the shading-compensation in this invention.

Subsequently to the preliminary scanning process as described above, image scanning process for optically reading the given objective image plane 11 is performed so as to obtain desired image data for reproducing the given image for the last time and will be described hereinafter with reference to the timing chart of FIG. 6.

Assuming that the m'th row of the sub-scanning lines virtually defined on the given image plane 11 is scanned with the image scanner 10, a series of image signals for the picture elements constituting the given image are outputted from the line sensor 15. When the image signal In of the n'th pixel in the m'th sub-scanning line fed from the line sensor 15 is quantized by the A/D converter 16 to produce a digital coded image signal IDn. The image signal IDn thus produced is sent to the subtracter 20a via the gate G2 and compared there with the black reference value VBn to obtain the difference (IDn−VBn), i.e. actual image value, similarly to the manner in that the aforementioned comparative value is obtained.

Also in this image scanning process for the given objective image, like procedures for reducing the time required for reading the given objective image are followed. Namely, when the n−1'th picture element on the objective image ahead of the n'th pixel is read in the period t0-t1, the comparative value ΔVn of the n'th pixel is read out from the comparative value memory 17b and transferred to the first latching circuit LT22 in the second latch unit 19. At the beginning of reading the n'th pixel (t1), the comparative value ΔVn is transferred from the first latching circuit LT21 to the second latching circuit LT22 in the second latch unit 19. The comparative value ΔVn stored in the second latching circuit LT22 is read out from the circuit LT22 to an arithmetic circuit 20b in synchronism with the transfer of the actual image value represented by the difference (IDn−VBn) to the arithmetic circuit 20b in the period t1-t2. In the arithmetic circuit 20b, there is obtained the ratio of the image signal IDn to the comparative value ΔVn, namely (IDn−VBn)/ΔVn which can be expressed as follows:

$$\theta n = \frac{IDn - VBn}{VWn - VBn} = \frac{IDn - VBn}{\Delta Vn} \quad (1)$$

wherein, $\theta n$ stands for shading-compensation value of the n'th pixel, IDn for an image signal obtained by scanning the given objective image, VWn for white reference value of the n'th pixel on the white standard image, VBn for black reference value of the n'th pixel, ΔVn for difference (VWn−VBn) between the white and black reference values, IDn−VBn for an actual image value, and n for the number of picture elements in an m'th sub-scanning line.

All the picture elements ($n=1 \ldots n_{max}$) in the m'th sub-scanning line are successively scanned and processed one by one in accordance with Formula (1) given above while incrementing the memory address each time the scanning of one picture element is finished.

Thus, the shading-compensation value $\theta n$ can be obtained as the ratio of the actual image value (IDn−VBn) on the n'th pixel in the distribution curve ID of the quantity of light reflected on the given objective image relative to the shading-compensation value ΔVn as is plain from FIG. 4. Substitution of the shading-compensation value $\theta n$ into picture gradation yields a required compensating output signal IDout. If the picture gradation in a resultant image reproduced finally is set to 256 (8 bits), the compensating output signal IDout may be obtained by multiplying the shading-compensation value Δn by 256 as gradation coefficient F (Δn×F). As a matter of course, in a case where the resultant image obtained finally is represented by 4 bits, the aforesaid gradation coefficient F becomes 16.

As described above, the light b reflected on the given objective image plane suffers shading-distortion resulting from nonlinear characteristics of optical systems including an image sensor, the optical damping factor of the optical systems and the absolute dark tone of a given objective image can be determined by performing the arithmetic operations according to Formula (1) noted above so as to completely compensate the shading-distortion caused in the optical system.

The compensating output signal IDout obtained from the processing according to the above Formula for compensating the shading-distortion is temporarily stored in an output buffer 21 and outputted to an external image processing device 23 through an interface (I/F) 22. Thus, according to this invention, the desired image reading operations independent from shading-distortion can be carried out at high speed to obtain a reproduced image of good quality.

Figure 7:
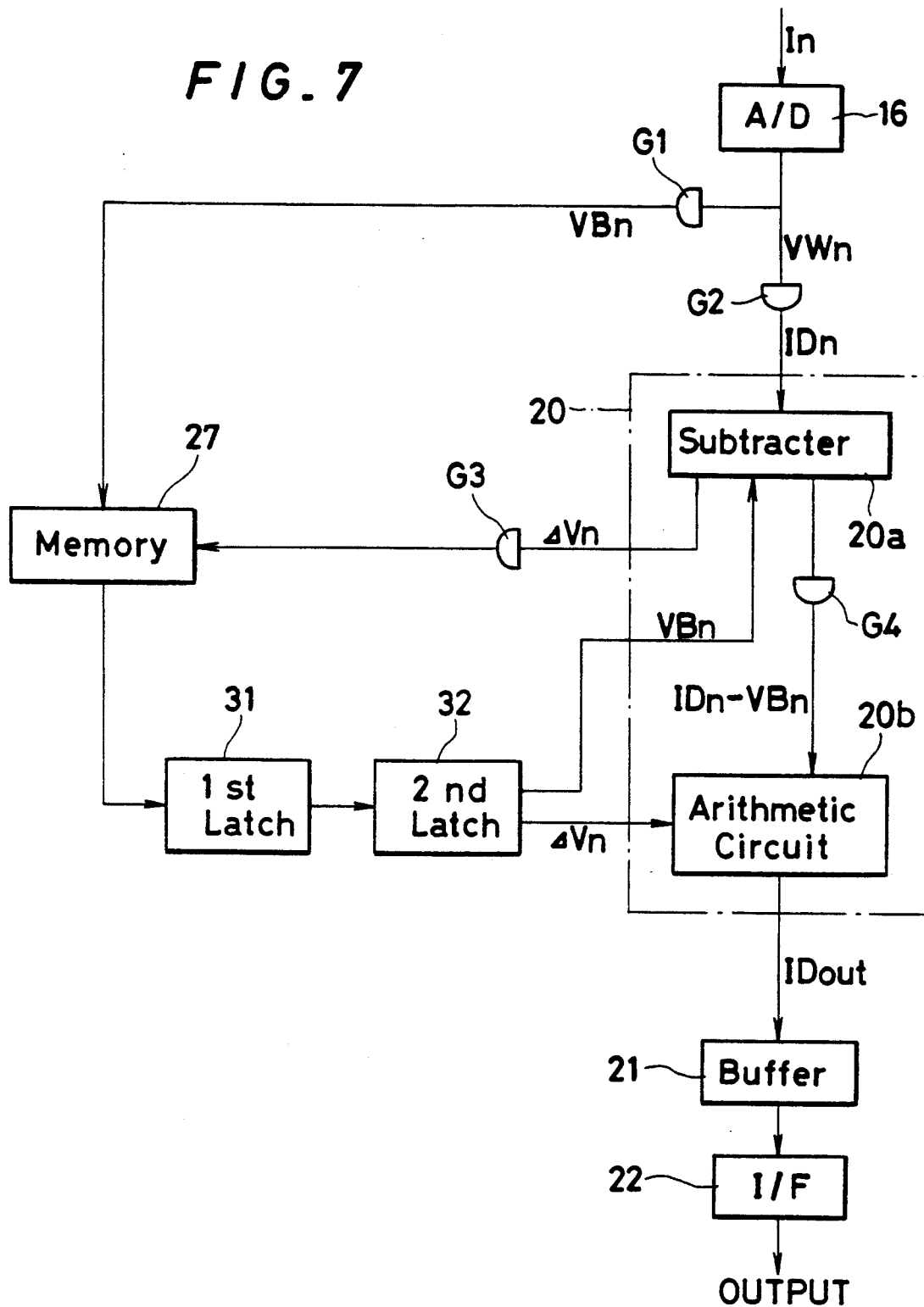
FIG. 7 is a schematic block diagram showing another embodiment of this invention.

In the embodiment described above, though the first and second latch units 18, 19 are each provided with the latching circuit for the reference value and the latching circuit for the comparative value, however, the subtractions in the subtracter 20a and the arithmetic operations in the arithmetic circuit 20b are not simultaneously carried out. Therefore, the first and second latch units each may consist of one latching circuit as shown another embodiment of in FIG. 7. In this case, the aforesaid reference value memory 17a and comparative value memory 17b may be constituted by one memory as indicated by numeral 27 in FIG. 7. That is to say, the first latch unit 31 is composed of one memory unit having input terminals connected to the memory 27 and the second latch unit 32 is composed of one memory unit having output terminals connected to the processing unit 20 as shown in FIG. 7. Namely, the first and second latch units 31 and 32 are interposed in a series between the memory 27 and the processing unit 20. Therefore, the reference value or comparative value can be selectively transferred from the memory 27 to the first latch unit 31. In the case where the reference value is stored in the second latch unit 32, it is read out therefrom and transferred to the subtracter 20a in the processing unit 20. On the other hand, the comparative value stored in the second latch unit 32 is fed to the arithmetic circuit 21b. According to this embodiment, the circuit structures of the memory means and latching circuits can be made rather simple.

Though in the foregoing embodiments the black standard plane is first processed in the preliminary scanning process so as to obtain and store the black reference value in the reference value memory 17a or memory 27 in advance, as a countermeasure the white standard plane may be scanned prior to the preliminary scanning for the black standard plane as a matter of course. That is to say, the white standard plane is first subjected to preliminary scanning to determine and store the white reference value VWn in the reference value memory, and thereafter, the black reference value VBn is subsequently obtained by scanning the black standard plane and subjected to subtraction with the white reference value VWn determined in advance. In this case, the arithmetic processing is performed in accordance with the following Formula (2).

$$\theta n = \frac{VWn - IDn}{VWn - VBn} = \frac{VWn - IDn}{\Delta Vn} \quad (2)$$

wherein, VWn−IDn represents actual image value at the n'th pixel. This actual image value in this case is reciprocals of the value (IDn−VBn) in Formula (1) noted above.

Needless to say, most elements of the device depicted in FIG. 7 have the same function as their counterparts in the foregoing embodiments. These elements are assigned by the same reference numerals as those in FIG. 3 and will not be described further here.

As is clear from the foregoing description, in accordance with the present invention, since the comparative value of the n+1'th pixel which is previously determined as the difference between the white and black reference values is read out from the memory while the image signal of the n'th pixel is subjected to arithmetic operations, shading-compensation operations can be readily carried out at high speed without causing a time lag in the transition of image reading processes from the n'th pixel to the subsequent n+1'th pixel.

As can be readily appreciated, it is possible to deviate from the above embodiments of the present invention and, as will be readily understood by those skilled in this art, the invention is capable of many modifications and improvements within the scope and spirit thereof. Accordingly, it will be understood that the invention is not to be limited by these specific embodiments, but only by the scope and spirit of the appended claims.

What is claimed is:

1. A method for compensating shading-distortion in image processing which comprises:

preliminary scanning white and black standard images;

determining comparative values from white and black reference values obtained by said preliminary scanned white and black standard images, the comparative value for the n'th pixel being determined from difference between the white and black reference values obtained by respectively subjecting n'th pixels on white and black standard planes to preliminary scanning;

obtaining an actual image signal by subjecting an image signal obtained by reading an n'th pixel on a given objective image to subtraction with the corresponding reference value for the n'th pixel;

comparing said actual image signal for the n'th pixel with said comparative value of the corresponding pixel to produce a compensating value for the n'th pixel which is represented by the ratio of said actual image signal to said comparative value, to thereby compensate said image signal with the compensating value, said compensating value for the n'th pixel being determined by multiplying the shade-compensation value which is represented as the ratio of said actual image value to said corresponding comparative value by coefficient representing gradation of a resultant image to be reproduced;

rendering said comparative value of an n+1'th pixel for being compared with an image signal for the n+1'th pixel at the time that the shading-compensation of the n'th pixel is completed and reading out the comparative value of the n+1'th pixel for comparing the image signal of the subsequent pixel therewith at the time that the shading compensation of the n'th pixel is completed.

2. A device for compensating shading-distortion which comprises:

memory means consisting of a reference value memory for storing white or black reference values obtained by preliminarily scanning white and black standard images and a comparative value memory for storing comparative values obtained from differences between said white and black reference values;

a processing unit for obtaining actual image values by subjecting image signals obtained as a result of reading given objective image to subtraction with the corresponding reference values, and comparing the actual image values with the corresponding comparative values to produce compensating values represented by the ratio of the actual image signals to the comparative values, and at least one set of first and second latch means for temporarily latching the comparative values one after another so as to store the comparative value of an n+1'th pixel in the first latch unit when the comparative values one an n'th pixel is stored in the second latch means, said first latch means being composed of a pair of first latching circuits for respectively storing temporarily the reference value and comparative value for the n+1'th, and said second latch means being composed of a pair of second latching circuits for respectively storing temporarily the reference value and comparative value for the n'th pixel.

3. A device for compensating shading-distortion according to claim 2, wherein said processing unit comprises a subtracter for subjecting the white and black reference values to subtraction thereby to obtain the comparative values from differences between the white and black reference values and an arithmetic circuit for obtaining compensating values by comparing the actual image signals from the subtracter with the comparative values.

4. A device for compensating shading-distortion according to claim 2, wherein said first and second latch units are serially connected between the memory means and the processing unit so that the reference and comparative values outputted from said memory means are selectively fed to the subtracter or arithmetic circuit.

* * * * *